United States Patent [19]

Scarborough

[11] 4,085,825

[45] Apr. 25, 1978

[54] VIBRATORY SYSTEM ISOLATION AND FLEXURE PIVOT

[75] Inventor: William M. Scarborough, Whittier, Calif.

[73] Assignee: Rockwell International Corporation, El Segundo, Calif.

[21] Appl. No.: 564,950

[22] Filed: Apr. 3, 1975

[51] Int. Cl.² .................................................. F16F 7/10
[52] U.S. Cl. ...................................... 188/1 B; 74/5 R
[58] Field of Search ................... 188/113; 248/20–22; 74/5 R; 308/2 A

[56] References Cited

U.S. PATENT DOCUMENTS

| | | | |
|---|---|---|---|
| 2,534,963 | 12/1950 | Fowler | 188/1 B X |
| 2,838,137 | 6/1958 | Wallerstein | 188/1 B |
| 3,306,399 | 2/1967 | Flannelly | 188/1 B |
| 3,700,291 | 10/1972 | Hadland | 308/2 A |
| 3,878,725 | 4/1975 | Gaertner | 73/398 C |

*Primary Examiner*—Duane A. Reger
*Attorney, Agent, or Firm*—H. Fredrick Hamann; Rolf M. Pitts; Allan Rothenberg

[57] ABSTRACT

A ring laser gyro body is rotationally dithered about a single cantilevered flexure pivot and its rotational vibration is isolated by a counter-rotating mass driven from the gyro body by a tightly coupled linkage.

9 Claims, 6 Drawing Figures

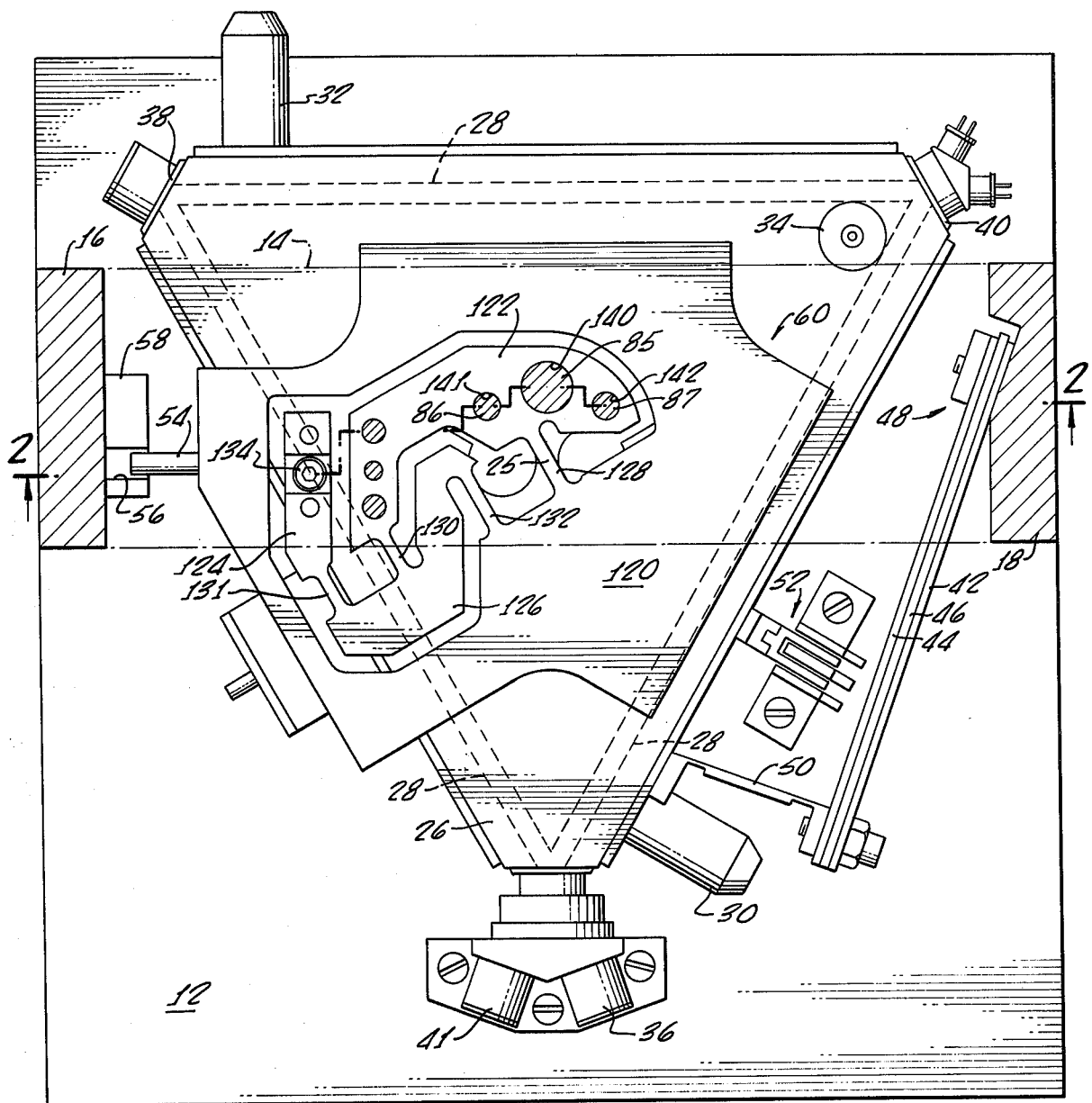
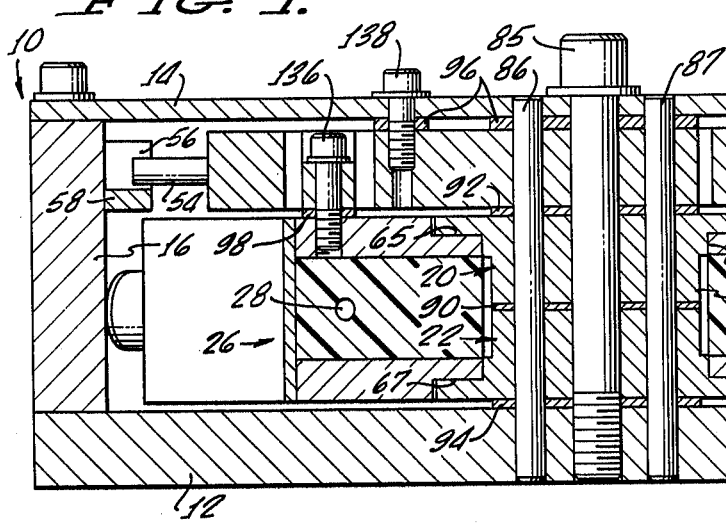
FIG. 1.
FIG. 2.

1

VIBRATORY SYSTEM ISOLATION AND FLEXURE PIVOT

BACKGROUND OF THE INVENTION

A ring laser gyro employs a pair of laser beams traveling in opposite directions about a common closed path to thereby sense rotation of the laser mounting body. Sensed rotation is indicated by a frequency difference of the counter-rotating laser beams. Such an instrument exhibits a dead zone at low rotational rates which may cause the two laser beams to lock together in frequency, thus introducing an error into the output. It has been found that the adverse effects of this dead zone and the output error caused thereby can be substantially minimized or eliminated by rotational dither. For this reason, such a ring laser gyro has its gyro body mounted to the gyro case for a limited rotational oscillation (an angular or rotary vibration) about a rotation axis. A closed loop torquer and pickup drive is employed to rotationally dither or oscillate the gyro body through a small angular displacement about such rotation axis.

Although the dither solves the one problem, it introduces several others. These problems include a decrease in stiffness of the gyro mounting, generation of and sensitivity to vibration of the instrument support, and a lag or overshoot response to high input rotational rates to be measured by the instrument.

Particularly because of the orientation sensitivity of a gyroscopic instrument, it is necessary that it be rigidly mounted to a case with high stiffness about all axes other than the desired rotational dither axis. In addition, there must be an exceedingly tight restraint against any translational motion of the gyro body relative to its case. For these reasons, the nature and construction of the pivot mounting are highly significant in that the mounting must permit the rotational dither about one axis while exerting a maximum restraint against all other motions of the gyro body relative to its case.

The gyro generates heat, which is commonly transferred to the case for dissipation. Where a pivotal mounting is employed, heat must be transferred from the gyro to the case through the pivot. Accordingly, such a pivot must have good heat transfer characteristics. A pivot structure previously employed for a dithered ring laser gyro has embodied a spoked wheel type structure having an outer rim fixed to the case and having its hub fixed to the gyro body. A number of radially extending flexible spokes interconnect the hub and rim to allow limited relative rotation of the rim and hub. Such a pivot arrangement has a number of disadvantages with regard to heat transfer, with regard to stiffness of the mounting about other than the rotation axis, and with regard to stress concentrations in the material of the pivot. In such a wheel and hub arrangement, the spokes must experience a double bend since they are constrained at each end, at the hub at one end and at the wheel rim at the other end. Further, the spokes are necessarily displaced radially outwardly from the center of rotation wherefor, for both of these reasons, the bend angle of each spoke is increased. The double bend inherently requires a longer, more slender bending element for a given maximum stress. The greater angle of bend, due in part to the displacement of the point of bend from the center of rotation, also dictates a smaller cross section of the flexural spoke for a given maximum stress. The longer and thinner element, even though several are used, will provide considerably less stiffness and thus considerably less restraint against motions other than the desired rotational dither. Further, because of the required relatively narrow cross section and increased length of the flexural spokes of such a pivot arrangement heat transfer is considerably decreased.

Another problem exhibited by the rotationally dithered gyro is the transfer of rotational vibration forces via the case to and from the gyro body. Thus, the forced vibration of the gyro body about its dither axis may be transmitted through the case to other instruments including other gyros, accelerometers and the like that may be mounted on a common support. Similarly, disturbing forces generated outside of the case (by other instruments mounted on the common support) may be transmitted from the case to the vibrating gyro body and thus introduce errors in the instrument output. Still another problem is the possibility of a lag or overshoot of the amplitude of instrument response to high input rates. Because of the relatively low stiffness pivotal mounting of the gyro body, rotation of its support is not precisely transmitted to the gyro body which may lag or overshoot.

The above-mentioned problems of the ring laser gyro, namely, those concerned with pivot structure and vibration transmission and amplitude, are merely exemplary of similar problems found in other types of instruments and mechanisms which are subject to vibration and limited pivotal motion. It is an object of the present invention to eliminate or significantly minimize such problems. Principles of the invention will find application not only in ring laser gyros but in various other types of instruments and mechanisms in which such problems exist.

SUMMARY OF THE INVENTION

In carrying out principles of the present invention in accordance with a preferred embodiment, vibratory apparatus includes a pivotal mount comprising a flexural member that mounts the device to the support for vibratory motion about an axis extending through the member. From another point of view, the improved pivot comprises a second section cantilevered from a first section to thereby define the pivot axis by the bending of the cantilevered member that extends between the sections. According to another feature of the invention, the position of the pivotal axis is more closely defined by providing the cantilevered flexural member with a bending stiffness that has a minimum substantially at the desired bending axis.

For isolation of rotational vibratory forces transmitted via the support, a mass member is separately pivoted to the support and vibrated to provide a system having a net angular momentum of zero. This may be achieved by mechanically coupling the mass member and the vibratory device so that the products of moment of inertia and displacement of the vibratory device and mass member are equal and opposite. A tight coupling is provided to vibrate the mass member in response to vibration of the vibratory device. In a specific mechanization, tightness of the coupling between the vibrating gyro body and the counter vibrating mass is enhanced by using a coupling linkage integrally formed with the counter vibrating mass member.

BRIEF DESCRIPTION OF THE DRAWINGS

FIG. 1 is a plan view, with the top of the case removed, of a ring laser gyro construction embodying principles of the present invention;

FIG. 2 is a section taken on lines 2—2 of FIG. 1;

DETAILED DESCRIPTION

Figure 3:
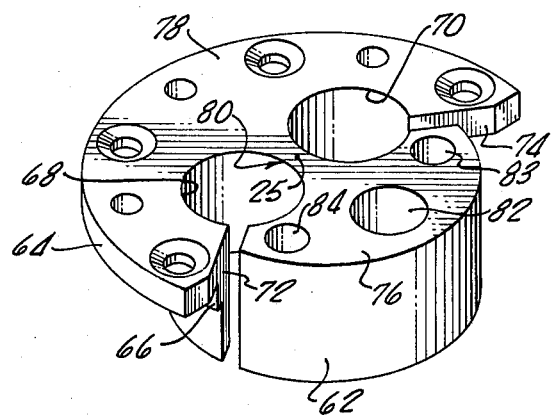
FIG. 3 is a perspective view of one part of the gyro body cantilevered pivot.

As illustrated in FIGS. 1, 2 and 3, a ring laser gyro comprises a rigid case 10 having a base 12, and a top plate 14 rigidly interconnected by lateral standards 16, 18. A pair of identical pivot structures 20, 22 to be more particularly described below, pivotally mount a gyro body 24 to the case 10 for limited rotational motion about an axis 25 perpendicular to the plane of the paper in FIG. 1. Gyro body 24 comprises a substantially triangular assembly including a solid block 26 having a continuous bore 28 extending in a triangular path parallel to the sides of the gyro body assembly and around the periphery of the block 26. The bore is filled with a lasing gas that is electrically excited by a suitable array of electrodes such as a pair of cathodes 30, 32 and an anode 34. The arrangement provides a pair of oppositely directed laser beams, one of which traverses bore 28 in a first direction, clockwise as viewed in FIG. 1, for example, and the other of which traverses the same bore in an opposite direction or counter-clockwise, being retro-reflected by a corner reflector 36. Mirrors at other corners 38, 40 direct the beams through the continuous closed path of the triangular bore so that both are received in a detector or output device 41.

Rotation of the instrument and its case about its input axis (which may be parallel to but spaced from the gyro body rotation axis 25) will cause a difference in the nominally common frequency of the two counter-rotating laser beams and such difference, as manifested by detector 41, provides an output indication of the input rotation rate experienced by the instrument. However, it is not this instrument input rotation with which the present invention is concerned, but with the rotational dither of the gyro body. The ring laser gyro and its operation are well known and described, for example, in U.S. Pat. No. 3,373,650 for Laser Angular Rate Sensor and U.S. Pat. No. 3,467,472 for Random Bias for Laser Angular Rate Sensor.

As mentioned above, the laser output exhibits a dead spot through small input rotational rates. To eliminate output errors attributed to this dead spot, the gyro body is pivotally mounted by a pivot having similar parts 20 and 22, to be described in detail below, and is rotationally dithered about its pivot axis. That is, the gyro is rotationally oscillated or rotationally vibrated through a small angle by means of a closed loop torquer and feedback system. Such a torquer, for example, may comprise first and second elongated piezo electric elements 42, 44 fixedly connected to an interposed strip such as a brass layer 46. The piezo electric assembly is fixed at one end 48 to the case standard 18 and at the other end to a rigid connecting link 50 which itself is fixed to a side of the gyro block 26. A pickoff, such as a conventional capacitive pickoff 52, has one part fixed to the gyro block and the other part mounted to the base plate 12 to detect rotational motion of the gyro body about its pivot axis 25 and provide an electrical signal via circuitry (not shown) that excites the piezo electric torquer 42, 44, 46. Excitation of the torquer causes this elongated multilayer device to bend in one direction or the other thereby transmitting a compression or tensile force axially along connecting arm 50 to the gyro body and rotationally oscillating the latter about it rotational pivot 25. Preferably, the torquer and pickoff drive are tuned to the resonant frequency of the system, whereby minimized driving forces are required for the rotational dither.

Rotational motion of the gyro body is normally limited in amplitude by the resonant torquer drive but, as a safety feature, there is provided a stop in the form of a shaft 54 fixed to the gyro body and loosely extending into an aperture 56 of a stop body 58 fixed to standard 16. Aperture 56 has a width or inner dimension sufficiently greater than the outer dimension of stop shaft 54 so that no contact between elements 54 and 56 will occur during normal rotational dithering.

Also pivoted to the case 10 for limited rotational vibration about an axis coincident with, or at least parallel to, pivot axis 25 of the gyro body, is a mass member 60. Mass member 60 comprises a plate interposed between the gyro body and the top plate 14 of the case and connected to and between the case gyro body by a tightly coupled linkage. Specific details of the mass member and linkage will be described below.

Gyro Pivot Structure

Figure 4:
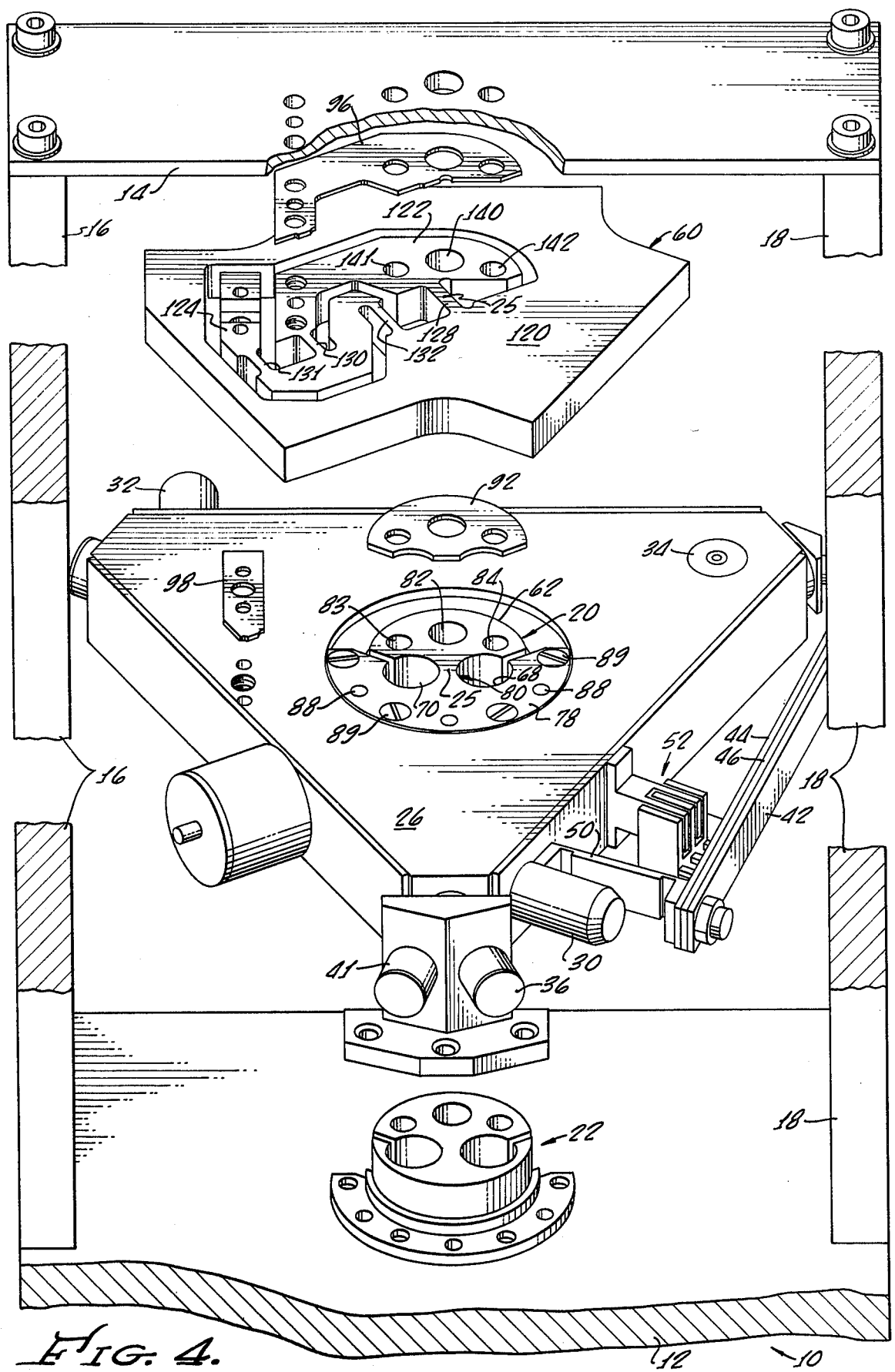
FIG. 4 is an exploded perspective view illustrating major components of the vibration cancelled rotationally dithered ring laser gyro of FIGS. 1 through 3.

Referring to FIGS. 2, 3 and 4 for a detailed description of the gyro body cantilevered pivot, it will be seen that the pivot actually comprises two identical but opposite hand or mirror image structures 20 and 22. A description of one will suffice to described both. The pivot structure comprises a right circular cylindrical body portion 62 having at one end thereof a radially outwardly and circumferentially extending flange 64 that extends slightly more than 180° around the periphery of the cylindrical central body portion 62. A stepped shoulder 66 interconnects the body portion 62 and flange 64.The pivot is divided into three integral sections by means of cut away portions extending entirely through the pivot along its axis. These cut away portions are provided by circular apertures 68, 70 and substantially linear outwardly extending channels 72, 74. Thus, the pivot structure includes a first section 76 which is connected to the gyro case and a second section 78, connected to the gyro body. The two sections 76 and 78 are interconnected by a cantilevered flexural element or section 80 bridging between the two sections and cantilevering the gyro body section 78 from the case connected section 76.

Section 76 is formed with a plurality of apertures 82, 83, 84 which respectively receive a bolt 85 and dowels or pins 86, 87 (FIG. 2) which extend through the case and both gyro pivot structures, bolt 85 being threaded to the case structure to provide a rigid interconnection. Pivot flange 64 is formed with a plurality of apertures which are illustrated as seven in number, four of which receive headed bolts 89 extending through the pivot flange and threaded into the gyro body and the other three of which receive positioning pins such as pin 88 (FIG. 4).

The gyro body is formed with an aperture extending entirely therethrough having a diameter slightly greater than the diameter of the cylindrical body portions 62 of the pivot structures so as to allow these portions of the pivot structures to be freely received and movable within the gyro body aperture. The aperture is provided with circular recesses 65, 67 at top and bottom of the gyro body that receive the pivot structure flange 64 of the upper and lower gyro pivot structures 20, 22, with the pivot shoulders 66 mating closely with the main bore of the gyro body aperture.

Both gyro pivot parts 20 and 22 (FIG. 2) are fixed to the case and to each other by means of the bolt 85 and pins 86, 87 and both are fixed to the gyro body on respectively opposite sides thereof and in mutual registration by means of the bolts and pins extending through the pivot structure flange 64 into the gyro body. Spacers 90, 92, 94 and 96 are interposed between the two gyro pivot parts, between the upper gyro pivot part and mass member 60, between the gyro and the case, and between the mass and the case to provide a rigid interconnected structure of the pivot assembly. A spacer 98 is also interposed between the gyro body and a section connecting the latter to the mass member coupling linkage. The several spacers have configurations that mate only with corresponding parts of the gyro pivot structures and mass member that are fixed to the case, leaving a free space between axially spaced adjacent and relatively rotatable parts (see FIG. 4).

The pivot configuration illustrated in FIGS. 2, 3 and 4 provides a structure of maximum rigidity (greater stiffness in directions other than the rotation direction) with a controllably located rotation or pivot axis. The pivot axis is defined by the bridging cantilever element or section 80 which has a minimum bending stiffness at a midpoint thereof, on axis 25, because at this point the cantilevered element has a minimum thickness. The depth of the cantilevered element, namely, its dimension as measured from top to bottom of the gyro body as viewed in FIG. 2, is uniform and significantly greater than the minimum thickness. Similarly, the length of the cantilevered flexural element, from the gyro connected section 78 to the case connected section 76 is greater than the minimum thickness. Nevertheless, this length may be relatively small, thereby to provide an improved heat transfer path.

The described pivot arrangement positions the rotation or pivot axis to extend through the flexure element and not displaced therefrom. This provides a maximized efficiency of material use because a greater amount of the material is provided precisely at and about the desired pivot axis 25. Thus, for a given angular displacement (of section 78 relative to section 76 about axis 25) and given thickness of material, the bending stress is minimized. If the bending of a flexure pivot takes place at a point displaced from the pivot axis (as would occur in the spokes of a spoked wheel arrangement), the magnitude of bending is greater, and thus the stress experienced by the bending element is greater. Further, because the amount of bending is less precisely at the pivot axis, and this flexural element bends at such axis, its length can be less without exceeding stress limits. That is, its length may be less and its thickness greater without exceeding stress limits. Further, being a cantilevered structure, one end is free and it is not subject to tensile forces exerted in a bending element constrained at both ends. Therefore, stresses are lower and spring rate is more readily controlled. Another advantage of the cantilevered flexure pivot is greater uniformity of its spring rate through its range of motion.

Both the decreased length and increased thickness enhance heat transfer through this flexural pivot.

The location of pivot axis 25 of this pivot structure is defined by providing a varying thickness or varying bending stiffness along the length of the cantilevered member or section 80. This is conveniently achieved by employing the substantially circular cut away portions 68 and 70 which, together with the channels 72, 74 separately define the pivot structure sections 76, 78, and also define the cantilever section 80. The latter, alternatively, may be defined by non-circular arcs and still provide a minimum bending stiffness at a desired location, since the thickness may be caused to increase from a minimum at the center of rotation is any suitable pattern that is capable or convenient for manufacture. Further, as will be seen in connection with the description of the cantilevered pivot of the counter-rotating mass, to be described below, the cantilever flexural section 80 may be made with a substantially uniform cross-section throughout its length, namely, a uniform thickness and depth, providing only for proper fillets to eliminate concentration of stress at the interconnection of the ends of the section 80 and the pivot sections connected thereto.

Vibration Isolation

Figure 6:
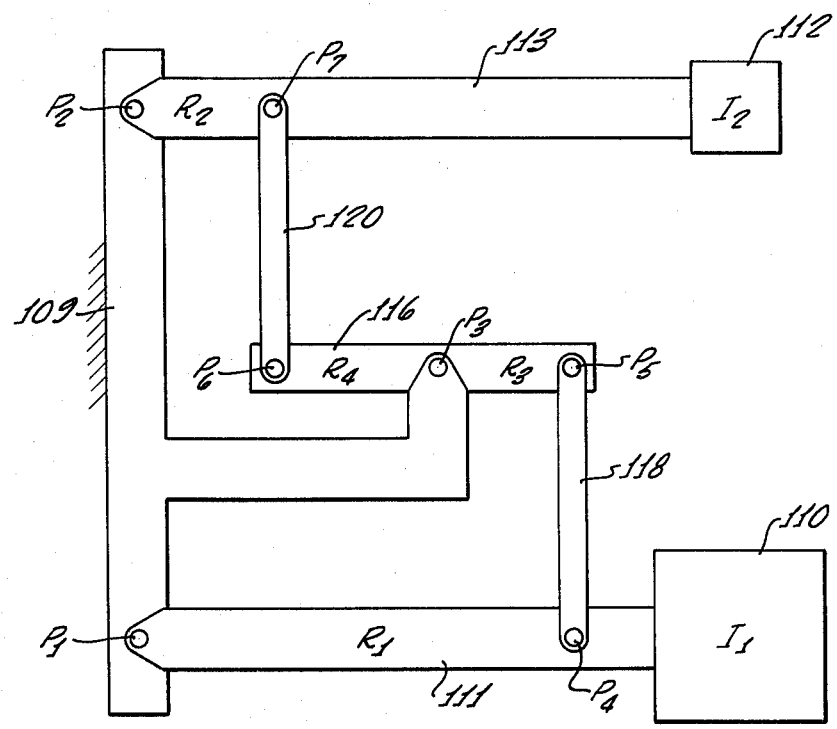
FIG. 6 is a schematic illustration of the vibration cancellation system of the dithered gyro of FIGS. 1 through 5.

The vibration isolation of the present invention may be explained with respect to the schematic illustration of FIG. 6 wherein the gyro body including the gyro block and its support is indicated by box 110 as comprising a body having a moment of inertia $I_1$ pivoted to case 109 on an arm 111 about the rotational dither axis $P_1$ of the gyro body. A counter-rotating mass 112 having a moment of inertia $I_2$ about its pivot axis $P_2$ is also pivoted to the case or common support 109 on a second arm 113. A linkage system interconnects the masses 110 and 112 and comprises a lever 116, likewise pivoted to case 109 about a pivot $P_3$. Connecting links 118 and 120 are interconnected between the respective ends of lever 116 and mass 110 on the one hand and mass 112 on the other. Link 118 is connected to arm 111 and lever 116 at points $P_4$ and $P_5$, respectively, while link 120 is connected to the lever 116 and arm 113 at points $P_6$ and $P_7$, respectively. When the body 110 moves through an angle $\theta_1$, about its pivot $P_1$, the interconnecting linkage 116, 118 and 120 causes the body 112 to move through an angle $-\theta_2$ in a rotational direction opposite the rotational direction of the first body 110. The relation between the angular displacements $\theta_1$ and $\theta_2$ and the precision with which this relation remains contant is determined by the geometry of the linkage (namely, the linkage ratio) and the stiffness of the linkage. It is important that the linkage provide a tight coupling, that is, have a high stiffness or low compliance so that synchronism of the vibratory motions of the two masses will be closely retained.

A primary condition for maintaining inertial balance and, thereby, vibration isolation in this system is to ensure and $$(\theta_2/\theta_1) = (I_1/I_2) \qquad \text{Eq. (1).}$$

This ratio may be termed the linkage ratio $R_L$ and $$R_L = (R_1 \times R_4)/(R_2 \times R_3) \qquad \text{Eq. (2)}$$

where $R_1$ is the distance between points $P_1$ and $P_4$, $R_2$ is the distance between $P_2$ and $P_7$, $R_3$ is the distance between $P_3$ and $P_5$, and $R_4$ is the distance between $P_3$ and $P_6$. In a particular example to be described below, the angular displacement of body 110, the gyro block and support, is preferably 0.002 radians and a linkage ratio of four is provided so that $\theta_2$ is equal to 0.008 radians. The greater angular displacement of the counter-rotating mass 112 permits the use of a smaller mass for the counter-rotation.

The significance of maintaining an inertial balance as defined by Equation (1) may be explained in terms of angular momentum. According to the principle of angular momentum, the rate of change of angular momentum of a rotating body with respect to its fixed axis of rotation is equal to the moment of all external forces acting on the body with respect to the same axis. In the case of a system of bodies rotating about the same axis and having moments of inertia $I_1$ and $I_2$, and angular velocities $\dot{\theta}_1$ and $\dot{\theta}_2$ about such axis, the equation of angular momentum may be written $$d/dt \, (I_1 \dot{\theta}_1 + I_2 \dot{\theta}_2) = M \qquad \text{Eq. (3)}$$

where $M$ is the moment of external forces with respect to the axis of rotation. For a perfectly isolated body such external moments total zero so that we may write $$I_1 \ddot{\theta}_1 = -I_2 \ddot{\theta}_2 \qquad \text{Eq. (4)}$$

where $\ddot{\theta}_1$ and $\ddot{\theta}_2$ are the angular accelerations, and $$-(I_1/I_2) = (\ddot{\theta}_2/\ddot{\theta}_1) \qquad \text{Eq. (5)}$$

Thus, the ratio of angular accelerations of the bodies of such an isolated system is inversely proportional to the ratio of their moments of inertia and accordingly, the ratio of angular displacements, $$\theta_2/\theta_1$$

is also inversely proportional of the ratio of the moments of inertia. If each of the bodies of the system is individually and conventionally statically and dynamically (in rotation) balanced so that translational forces acting through the rotation axis are effectively eliminated, remaining forces can only be torques or moments, and these are caused to total zero by choosing a linkage ratio that ensures $$(\theta_2/\theta_1) = (I_1/I_2)$$

This condition of isolation of external moments will exist for axes $P_1$ and $P_2$ that are either coincident or mutually displaced but mutually parallel. The moment of inertia of the connecting linkage may be relatively small so that it may be neglected. Alternatively, for analysis and calculations, the linkage moment of inertia may be combined with that one of the bodies (mass 110 in the illustrated example) which rotates in the same direction.

Although the coupling linkage arrangement schematically illustrated in FIG. 6 is preferred and has been mechanized in the described apparatus, it will be readily appreciated that different types of linkage arrangements and geometries may be employed in order to force a counter-rotation of mass body 112 that will provide a substantially zero net angular momentum. Coupling may be accomplished by other types of connecting devices such as gears, although tightness of coupling is more difficult to achieve in such arrangements.

The two mutually counter-rotating systems do not have to be tuned to have substantially equal resonant frequencies. Resonance or natural frequency of the gyro body (and its flexure pivot) or of the mass member and its pivot are individually not critical. Only the natural or resonant frequency of the tightly coupled assembly of rotatably oscillating bodies is significant. In other words, because the two vibrating systems (gyro body and mass member) are tightly coupled, it is only necessary to tune the entire assembly (and not its separate parts) to obtain resonance. Vibration at the resonant frequency of the assembly is desired for reasons including minimum required driving power and system stabilization.

Figure 5:
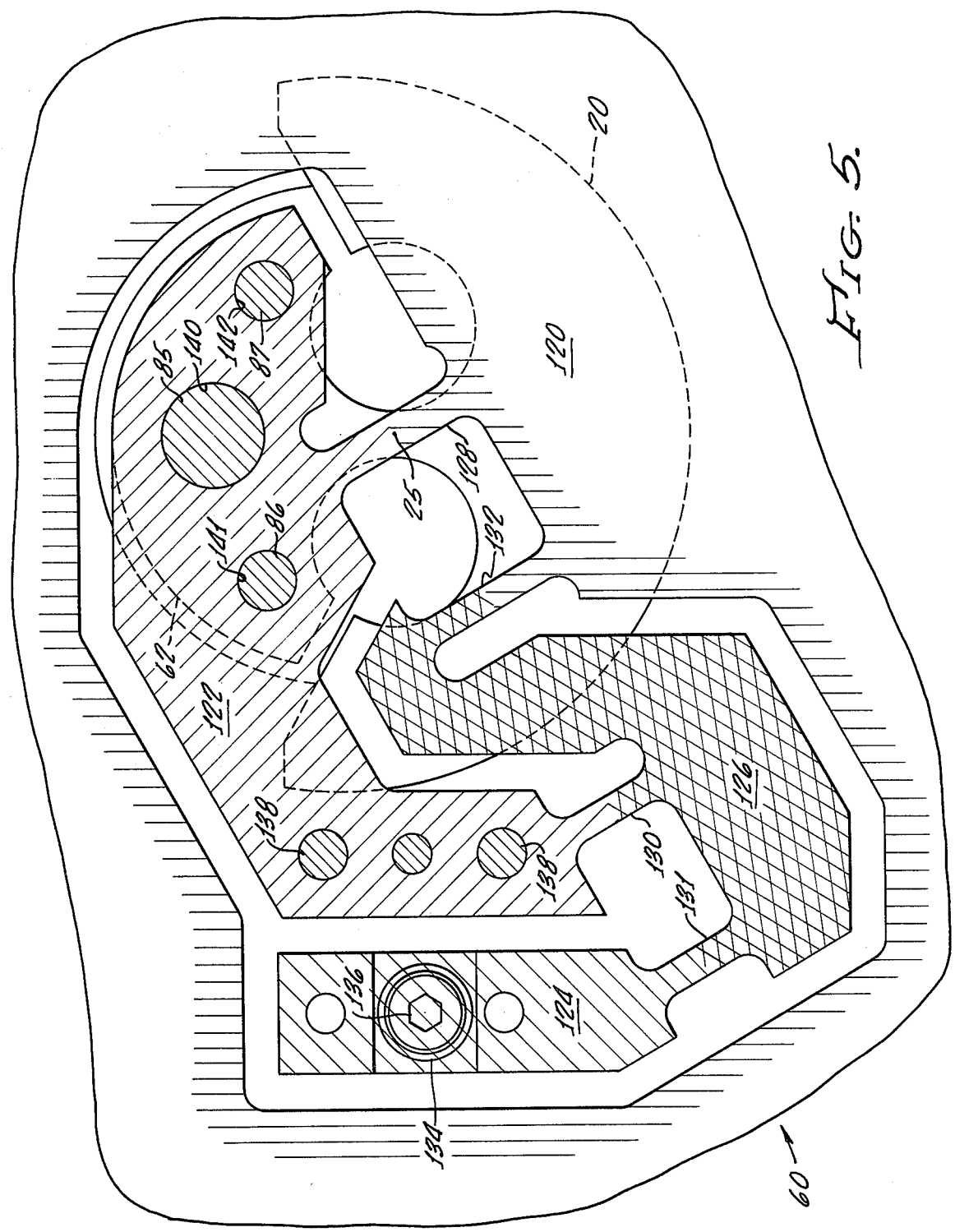
FIG. 5 is an enlarged view of part of the integral mass member and coupling linkage of the gyro.

To mechanize the schematically illustrated counter-rotation vibration isolation arrangement of FIG. 6, while providing maximized stiffness of the coupling linkage and compact mounting and arrangement of the mechanism, a single integral plate 60 is formed to provide the structure required to be added to the instrument to achieve the vibration isolation. Thus, a single rigid plate is formed, as by mechanical or electrical machining, with a plurality of channels extending entirely therethrough to separate the plate into a number of different interconnected sections and to define boundaries of such sections. As shown in FIG. 5, the several sections are identified by different types of shading for purposes of exposition. Thus, the channels or cutout portions define an outer or circumscribing mass section 120, a case mounting section 122, a gyro body connecting section 124, and a linkage lever 126. Also integrally formed as part of the single plate 60, are the pivot structures connecting the mass 120 to the case, connecting the linkage lever 126 to the case, and interconnecting the lever with the mass and the gyro body. Thus, a cantilever flexure element or section 128 is defined by the cutout portions and extends between case section 122 and mass section 120. Section 128 provides a rotational pivot axis for the mass which is substantially coincident with the pivot axis 25 of the gyro body cantilevered flexure pivot. The latter is shown in dotted lines in FIG. 5 to illustrate the coincidence of pivot axes of gyro body and mass member in this exemplary mechanization. However, as previously noted, only parallelism of these axes is required for the described vibration isolation.

The cutout sections also define a lever pivot section 130 having a substantially uniform cross-section and extending to and between the integral case mounting section 122 and lever section 126. Connecting link sections 131, 132 between the lever section 126 and the gyro mounting or connecting section 124 and mass section 120 are also formed by cutouts which define these link sections.

Gyro body connecting section 124 is provided with a first aperture 134 to receive a bolt 136 (FIG. 2) threaded through spacer 98 and into the gyro body. A pair of dowel pins extend through additional apertures in section 124 and spacer 98 and into the gyro body to rigidify this connection. A similar connection between both ends of case mounting section 122 and upper plate 14 of the case is provided by a pair of bolts 138 extending through holes in plate 14 and threaded into the case mounting section 122 together with a dowel pin (not shown) extending through the plate 14 into a third aperture in the case mounting section 122. Case mounting section 122 is relatively elongated and accordingly, at its other end, which is closer to the pivot axes of the mass and gyro body, it is also rigidly connected to the case structure. This connection is made by means of the previously described bolt 85 and dowel pins 86, 87 which extend through both the case top and bottom plates, and the two gyro pivot structures 20, 22. Bolt 85 and pins 86, 87 also extend through apertures 140, 141 and 142 in case mounting section 122 whereby the latter is rigidly secured to the case at points of maximum stress, that is, near the pivot section 128 on the one hand, and near the lever pivot section 130 on the other.

The unitary and integral construction of the mass, the lever system and connections thereto comprises a functioning counterpart of the counter-rotating system schematically represented in FIG. 6 in which both of the pivots, namely, the pivot that rotatably mounts mass 112 to the case and the pivot that rotatably mounts lever 116 of the linkage system to the case, are provided by cantilevered flexural elements of the general type employed for the gyro body pivot. However, these pivots are somewhat modified to accommodate greater angular displacement by forming them with substantially uniform thicknesses and bending stiffnesses throughout their length. Absent the provision of a minimum bending stiffness provided by such a minimum thickness (as in the gyro body pivot structure), the axis of rotation of such a flexure pivot, such as the axis 25 of pivot section 128, is less precisely defined and may vary to some extent along the length of the flexural section 128. Similarly, the rotation axis of pivot section 130 is less precisely positioned than is the pivot axis of the gyro pivot. Nevertheless, the axes of pivot sections 128 and 130 need not be as precisely located since the sections pivoted thereto, namely, mass section 120 and lever section 126, are relatively freely moving and instrument accuracy is not dependent upon precise location of such positions as it is upon the precise position and rotation axis of the gyro body.

Flexure sections 130 and 128 are the primary pivot structures of the integral mass and lever arrangement. Nevertheless, it will be understood that connecting link sections 131 and 132 also experience some bending in addition to their basically translational motion. The several connecting sections 128, 130, 131 and 132 have their midpoints all lying upon a single line and each extends substantially perpendicular to this line. This arrangement although not required, is preferred to provide parallel forces that may simplify analysis of the system. The use of a single integral part, machined, cut out or otherwise formed to define the several sections of the vibration isolation mechanism not only enhances the tightness of the coupling but facilitates the packaging by allowing the mass body 120 to circumscribe other operative portions including lever section 126 and the several pivot sections. Further, the arrangement facilitates location of the pivot axes of flexure section 128 at the center of mass of section 120. The several masses, the mass of section 120 and the mass of the rotationally dithering gyro body itself, are adjusted after assembly and after test operation to optimize static and dynamic balance. This is achieved in a conventional fashion by adding or removing adjusting weights (not shown) to uniformly distribute the body mass about the rotation axis. Such balancing has little or no effect upon rotary vibration isolation, as achieved according to Equation (1) above.

Pursuant to the analysis of the schematic arrangement of FIG. 6, where inertial effects of the coupling linkage were ignored, vibratory rotation isolation of the system of FIGS. 1, 2 and 3 is achieved when $$I_2\theta_2 = I_1\theta_1 + I_3\theta_3 \qquad \text{Eq. (6)}$$

where $\theta_1$, $\theta_2$ and $\theta_3$ are respectively, the angular displacements of the gyro body, the compensating mass, and the connecting linkage lever, and $I_1$, $I_2$ and $I_3$, are respectively, the moments of inertia of the gyro body, the compensating mass and the lever about their respective axes. In such an analysis, portions of the several connecting sections 128, 130, 131 and 132 on opposite sides of mid-sections thereof are included in the moments of inertia of the several connected sections. In the illustrated arrangement, the mass of the lever is considerably less than that of the compensating mass member 120 and the latter is likewise considerably less than the mass of the gyro body. Further, the angular displacement of the linkage lever 126 is less than that of the compensatory mass and accordingly, the inertia of the coupling linkage and its lever is of lesser effect and may be neglected in most calculations or combined as indicated by Equation (6). Similarly, moments of inertia of the portions of the gyro torquer and pickoff which are connected to the gyro body may be neglected or included.

The gyroscopic instrument, as a whole, preferably has a resonant frequency within a preselected range, an exemplary resonant frequency for such an instrument being about 140 Hz. If the resonant frequency is too low, the laser beams may tend to lock. If the frequency is too high, internal accelerations may be unacceptably high. As previously mentioned, only the single resonant frequency of the assembly is of interest. The coupling linkage system forces the mass and the gyroscope body to rotationally oscillate or vibrate in precise synchronism with one another. Thus, the combined assembly of counter-rotating mass, gyro body and interconnecting linkage has its own resonant frequency.

Such an arrangement operates in a significantly different and improved manner as compared with a pair of oppositely vibrating but relatively independent systems of the same resonant frequency. Such independent resonant systems may effectively cancel vibration at such resonant frequency but provide relatively little isolation at other frequencies. Further, such systems will introduce other resonant frequencies in the neighborhood of the resonant frequency since the two may slightly vary in frequency. Further, external vibrations introduced through a common support may cause one or both of the separately resonant systems to be excited. Under some conditions one of two independent resonant systems may stop moving while the other greatly increases its amplitude.

With a coupling forcing the primary system and its counter-rotating system to vibrate in synchronism, as described herein, such an interconnected system is effectively isolated from outside disturbances. Such outside disturbances will have little or not affect upon the system. From another point of view, the two mutually coupled counter-vibrating systems, the gyro body and the counter-rotating mass system, provide a single resonant system of an exceedingly high Q, Q being a measure of the sharpness of the resonance peak of the system and indicating the relation of energy stored in the system to that required to excite it.

The isolated system of the present invention exhibits a high Q for a number of reasons. The low compliance tight coupling mechanism interconnecting the two rotationally dithered masses minimizes losses. There are no bearings in the movable parts to provide frictional losses since pivotal motions are achieved solely by flexure. As previously described, the interconnecting mechanical linkage isolates the two counter-rotating systems from outside disturbances and thus further minimizes losses. The system is isolated from outside disturbing forces of varying frequencies and not only from forces at the resonant frequency. Further, the system has a precise control of vibrational amplitude, both the rotationally dithered gyro body and the counter-rotating mass being vibrated through a predetermined and precontrolled amplitude by the single closed loop torquer drive. As previously explained, the relative amplitude of vibration of gyro body and mass are precisely controlled by the linkage ratio. The torquer drive, operating at the assembly resonant frequency, need supply only enough energy to make up losses from the high Q system and, by virtue of its closed loop control, does control the vibrational amplitude. Since the mass and the gyro body are mechanically interconnected, the drive may be applied to either the gyro body, to the mass, or to a suitable portion of the interconnecting linkage. In the described embodiment, application of the torquer drive to the gyro body is chosen because amplitude of the vibration of the gyro body is smaller than amplitude of vibration of the mass and the chosen piezo electric torquer provides but a short driving stroke.

The resonant frequency $F_r$ of the assembly, a system in which substantially no vibration is transmitted thereto or therefrom, is $$F_r = (1/2\pi)\sqrt{K_t g/I_t} \qquad \text{Eq. (7)}$$

where $K_t$ is the total spring rate or stiffness, $g$ is gravitational acceleration, and $I_t$ is the total moment of inertia of the system about axis 25.

System spring rate is comprised of the spring rate of the gyro pivot $K_1$ and the spring rates $K_2$, $K_3$, $K_4$ and $K_5$ of each of the connection sections 128, 132, 130 and 131, respectively. Each of these sections bends to some extent and its spring rate forms a part of the total spring rate. The spring rates of these cantilevered flexural elements is given by $$K = E\, b\, t^3/12\, L \qquad \text{Eq. (8)}$$

where $K$ is the spring rate, $E$ is the modulus of elasticity of the material, $b$ is the depth of the flexural section, which is the thickness of the plate from which the unitary mass and linkage section is formed (the vertical extent of the plate as viewed in FIG. 2), $t$ is the thickness of the flexural section as measured perpendicular to the axis of flexure and to the length of the section, and $L$ is the length of the section. In calculating the spring rate of a variable thickness cantilevered flexural section such as the section 80 of the gyro body pivot structure, a thickness $t$ may be assumed that approximates an average thickness of the section over its length. Alternatively, the spring rate of such a flexural element may be emperically determined by building a part and testing it in flexure, or may be determined by more precise mathematical calculation. The total spring rate $K_t$ is $$K_t = (K_1\theta_1^2 + K_2\theta_2^2 + K_3\theta_3^2 + K_4\theta_4^2 + K_5\theta_5^2)/\theta_1^2 \qquad \text{Eq. (9)}$$

where $K_1$ through $K_5$ are the spring rates of the gyro body pivot and the connecting sections 128, 130, 131 and 132, respectively, and $\theta_1$ and $\theta_5$ are the respective angular displacements. These angular displacements may be calculated for given linkage links and a given linkage ratio as indicated in connection with the schematic showing of FIG. 6 or may be emperically determined.

The total inertia $I_t$ is given by $$I_t = I_1 + \frac{\theta_2^2}{\theta_1^2}I_2 + \frac{\theta_3^2}{\theta_1^2}I_3 \qquad \text{Eq. (10)}$$

from which it can be shown that the resonant frequency of the system is $$F_r = \frac{1}{2\pi}\sqrt{\frac{(K_1\theta_1^2 + K_2\theta_2^2 + K_3\theta_3^2 + K_4\theta_4^2 + K_5\theta_5^2)g}{I_1\theta_1^2 + I_2\theta_2^2 + I_3\theta_3^2}} \qquad \text{Eq. (11)}$$

A preferable material for the integral plate 60 is a titanium alloy Ti-6Al-4V, an alloy of titanium, aluminum and vanadium having exceedingly high resistance to both fatigue and corrosion and having a good modulus of elasticity and high strength-to-weight ratio. With such a material and assumed moment of inertia of the gyro body of approximately 6.6 pound-inch², of the mass 120 of 1.70 pound-inch², and of the lever 126 of 0.01 pound-inch², linkage lengths (with reference to FIG. 6) $R_1 = 1.88$; $R_2 = 0.59$; $R_3 = 0.56$ and $R_4 = 0.72$, a depth $b$ of all of the pivot sections 128, 130, 131 and 132 of 0.5 inches, a depth of the gyro body pivot (total of both parts) of 1.16 inches, a thickness of 0.10; 0.06; 0.09; 0.09 inches, respectively, for pivot sections 128, 130, 131 and 132, an effective pivot section thickness of 0.17 inches for the gyro pivot, and an assumed linkage ratio of 4, an assembly resonant frequency of 142 Hz is provided.

There has been described a unique and improved vibrational system particularly useful for a rotationally dithered ring laser gyro wherein a cantilevered flexural pivot for the gyro body provides a bending axis at the axis of rotation to significantly improve stiffness and heat transfer of the pivot structure. A counter-rotating mass is mechanically coupled with the rotationally dithered gyro body to provide a high Q resonant system that is isolated from external disturbing forces and which itself transmits substantially no vibratory forces externally.

The foregoing detailed description is to be clearly understood as given by way of illustration and example only, the spirit and scope of this invention being limited solely by the appended claims.

What is claimed is:

1. In a gyroscopic device having a gyro body assembly vibratably rotated with respect to a gyro case, the improvement comprising means for providing vibration isolation between said assembly and said case, said means comprising a mass member rotatably mounted to said case, and rigid coupling means interconnecting said gyro body and said mass member for counter-rotating said mass member in synchronism with said body, said assembly being mechanically tuned to a preselected resonant frequency.

2. The apparatus of claim 1 wherein said mass member and said coupling means are integral with each other, said coupling means comprising a linkage system including a lever pivoted to said support.

3. The apparatus of claim 2 wherein said coupling means comprises linkage means pivoted to said case and connected with said gyro body and with said mass member.

4. A vibration isolated rotationally vibratory system comprising a support, a first body mounted on said support for rotational vibration, a second body mounted on said support for rotational vibration, and a coupling linkage system including a lever pivoted to said said support coupling said bodies for mutually opposed and synchronous rotational vibration to maintain the product of moment of inertia and angular displacement of said first body equal and opposite to the product of moment of inertia and angular displacement of said second body, said system being mechanically tuned to a single resonant frequency.

5. The system of claim 4 wherein said coupling means comprises a linkage interconnecting said bodies and formed integrally with at least one of said bodies.

6. A vibration isolated rotationally vibratory system comprising a support, a first body mounted on said support for rotational vibration, a second body mounted on said support for rotational vibration, and coupling means for coupling said bodies for mutually opposite rotational vibration to maintain the product of moment of inertia and angular displacement of said first body equal and opposite to the product of moment of inertia and displacement of said second body, wherein such coupling means comprises a linkage system including a lever pivoted to said support.

7. The system of claim 6 wherein said coupled bodies comprise an assembly having a resonant frequency, and including means connected with said support for imparting a driving force to said assembly to effect vibration of said coupled bodies and coupling means substantially at said resonant frequency.

8. The system of claim 6 wherein each of said bodies is mounted to said support for vibratory rotation about an axis extending substantially through its center of mass.

9. The system of claim 6 wherein said bodies are mutually independently mounted to said support and wherein said coupling means includes means for causing one of said bodies to move in synchronism with the other but in the opposite direction.

* * * * *